United States Patent
Lee et al.

(10) Patent No.: US 7,545,624 B2
(45) Date of Patent: Jun. 9, 2009

(54) MULTILAYER CHIP CAPACITOR

(75) Inventors: Byoung Hwa Lee, Gyunggi-do (KR);
Sung Kwon Wi, Seoul (KR); Hae Suk Chung, Seoul (KR); Dong Seok Park, Seoul (KR); Sang Soo Park, Gyunggi-do (KR); Min Cheol Park, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 11/902,398

(22) Filed: Sep. 21, 2007

(65) Prior Publication Data

US 2008/0074826 A1    Mar. 27, 2008

(30) Foreign Application Priority Data

Sep. 22, 2006    (KR)    ............ 10-2006-0092425

(51) Int. Cl.
*H01G 4/228* (2006.01)
(52) U.S. Cl. ............ 361/306.3; 361/306.1; 361/303; 361/311; 361/321.1; 361/321.2
(58) Field of Classification Search ............ 361/306.1, 361/306.3, 321.1, 321.2, 311–313, 302–305, 361/307–308.1, 306.2

See application file for complete search history.

(56) References Cited

U.S. PATENT DOCUMENTS

| | | | |
|---|---|---|---|
| 5,880,925 A | | 3/1999 | DuPre et al. |
| 5,889,445 A | * | 3/1999 | Ritter et al. ............ 333/172 |
| 6,061,227 A | * | 5/2000 | Nogi ............ 361/303 |
| 6,104,599 A | * | 8/2000 | Ahiko et al. ............ 361/306.3 |
| 6,191,932 B1 | * | 2/2001 | Kuroda et al. ............ 361/303 |
| 6,430,025 B2 | * | 8/2002 | Naito et al. ............ 361/303 |
| 6,441,459 B1 | | 8/2002 | Togashi et al. |
| 6,850,404 B2 | * | 2/2005 | Engel et al. ............ 361/301.4 |
| 7,199,996 B2 | * | 4/2007 | Togashi et al. ............ 361/303 |

\* cited by examiner

*Primary Examiner*—Nguyen T Ha
(74) *Attorney, Agent, or Firm*—McDermott Will & Emery LLP

(57) ABSTRACT

A multilayer chip capacitor including: a capacitor body where a plurality of dielectric layers are deposited, the capacitor body having opposing first and second sides and opposing third and fourth sides; a plurality of layers of internal electrodes deposited alternately with the dielectric layers in the capacitor body; at least one first external electrode formed on the first side; and at least one second external electrode formed on the second side, wherein the first and second external electrodes are staggered with respect to each other and spaced apart from each other at a certain distance in a length direction of the first side.

17 Claims, 7 Drawing Sheets

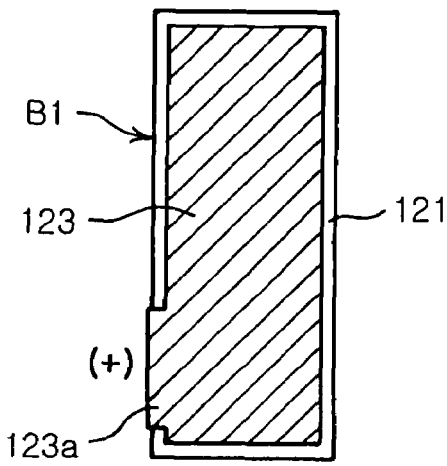
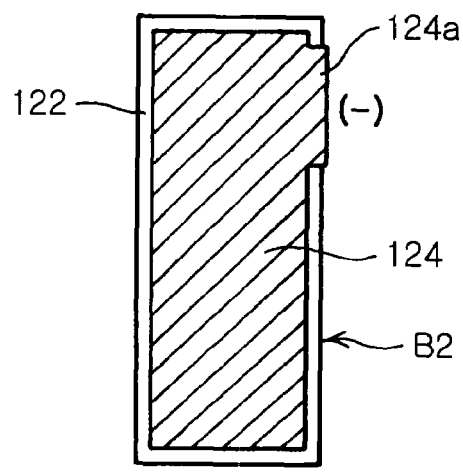
FIG. 3A
FIG. 3B
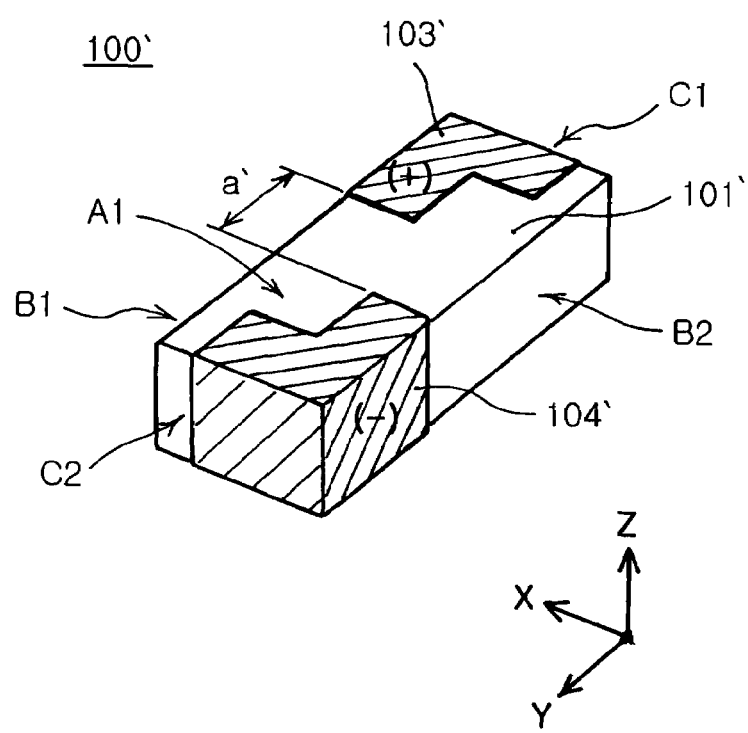
FIG. 4

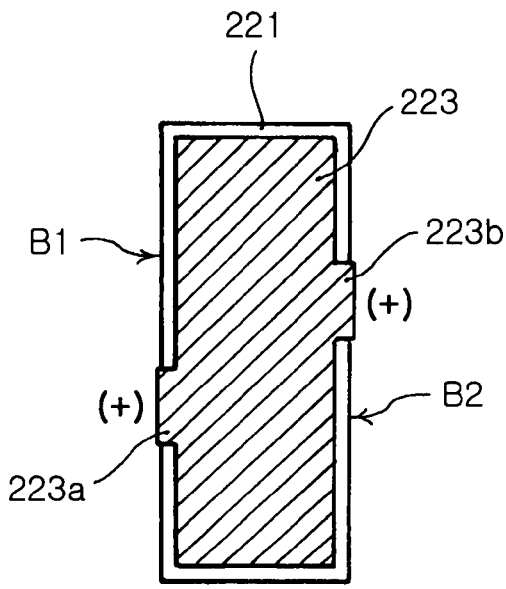
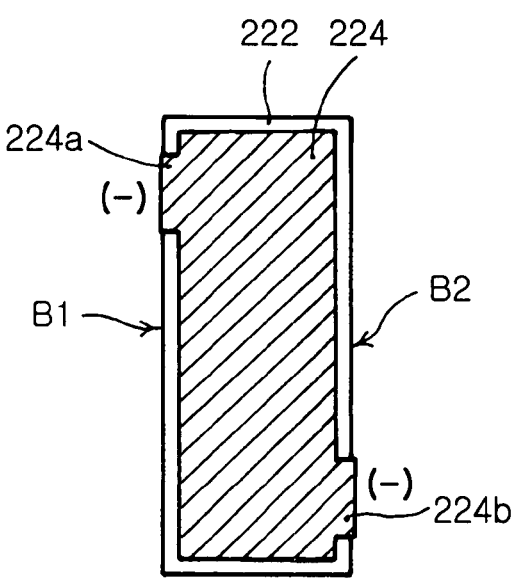
FIG. 7A   FIG. 7B
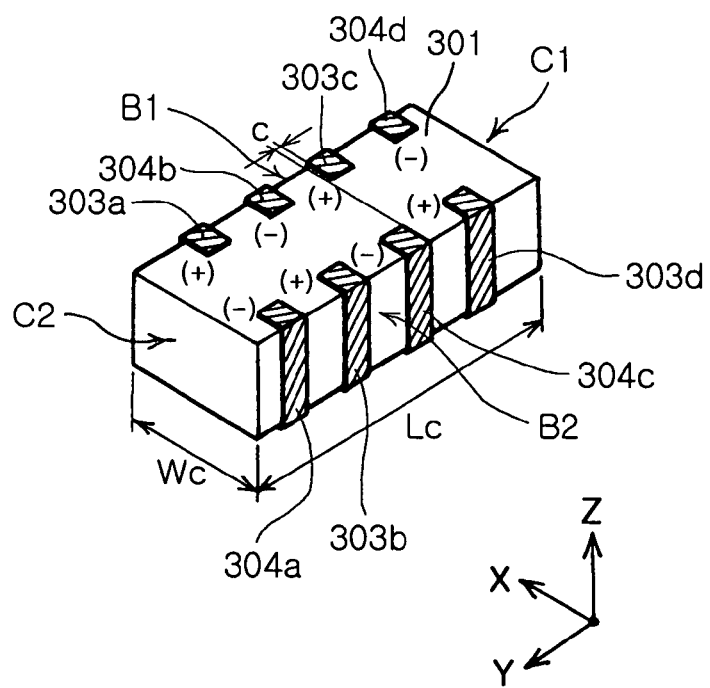
FIG. 8

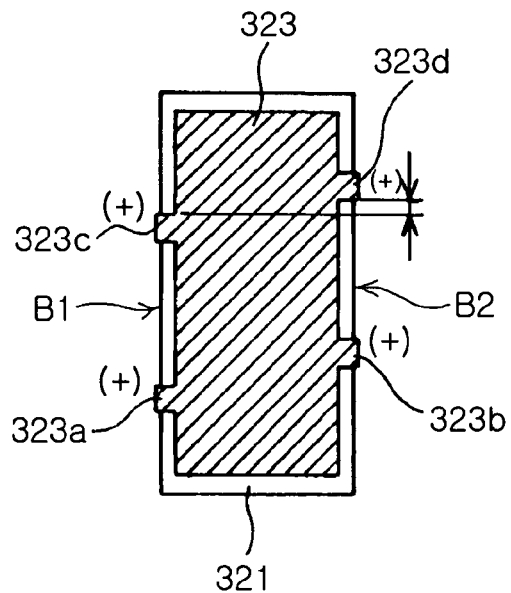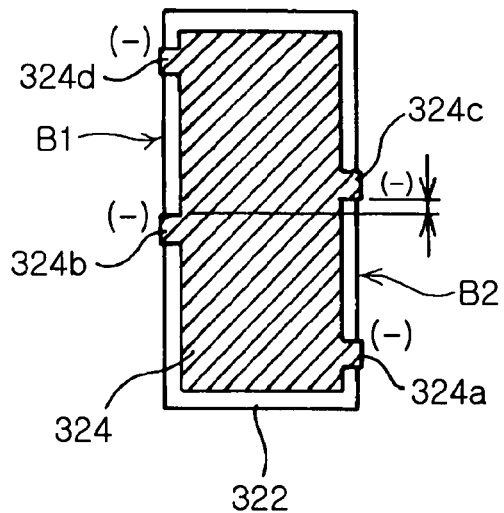
FIG. 9A  FIG. 9B
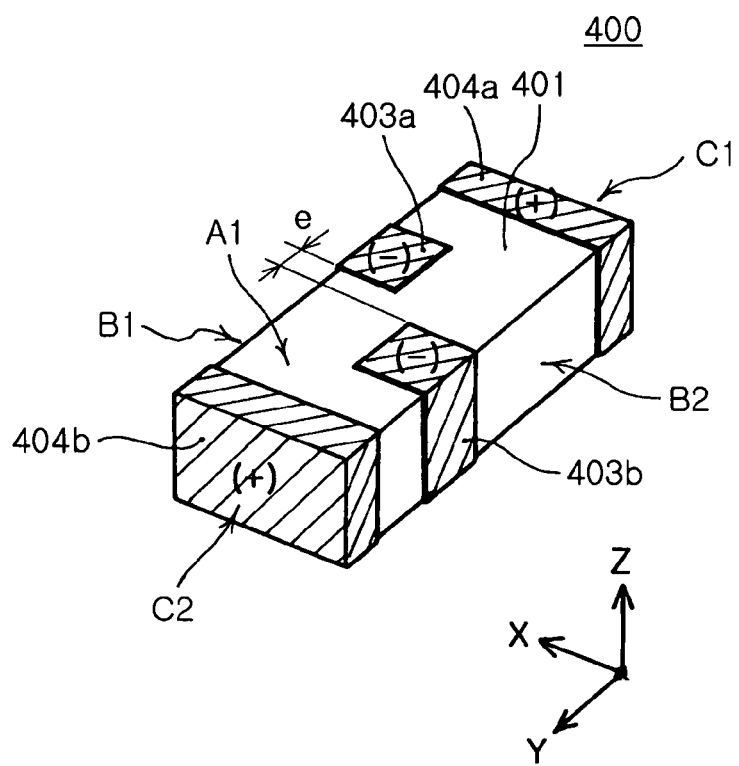
FIG. 10

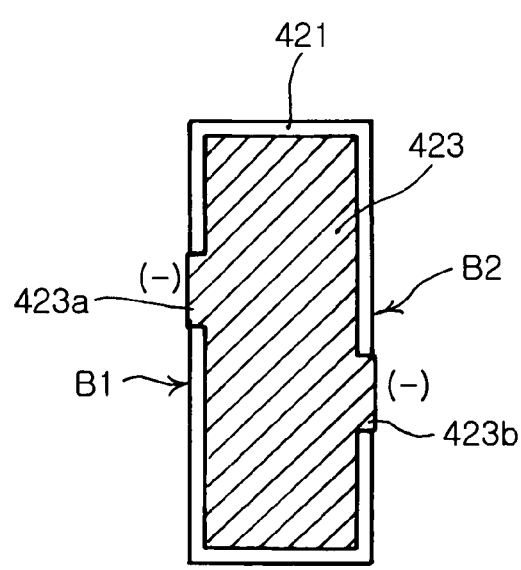
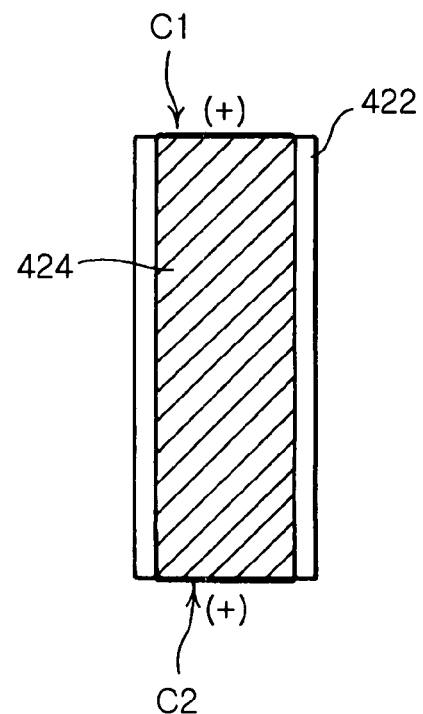
FIG. 11A  FIG. 11B
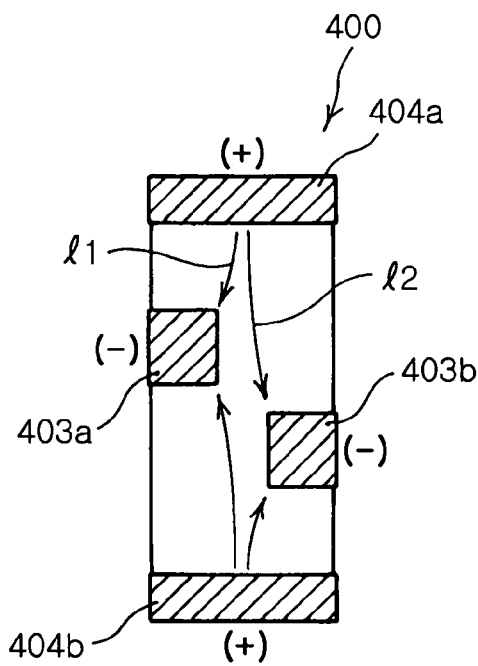
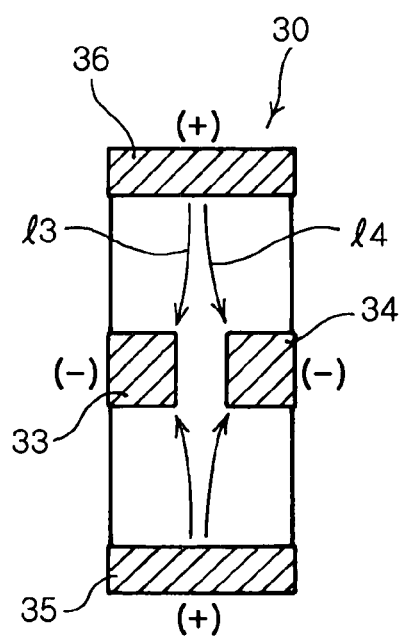
FIG. 12A  FIG. 12B

US 7,545,624 B2

MULTILAYER CHIP CAPACITOR

CROSS-REFERENCE TO RELATED APPLICATIONS

This application claims the priority of Korean Patent Application No. 2006-92425 filed on Sep. 22, 2006, in the Korean Intellectual Property Office, the disclosure of which is incorporated herein by reference.

BACKGROUND OF THE INVENTION

1. Field of the Invention

The present invention relates to a multilayer chip capacitor, and more particularly, to a highly reliable and smaller-sized multilayer chip capacitor in which external electrodes on opposing sides are prevented from being shorted to each other.

2. Description of the Related Art

A multilayer chip capacitor is beneficially employed as a decoupling capacitor disposed in a high-frequency circuit as a large-scale integration (LSI) power circuit. To ensure a stable power circuit, the multilayer chip capacitor should be further decreased in equivalent series inductance (ESL), and reduced in size to allow a great number of capacitors connected in parallel to be adopted. Such a demand has been rising due to a higher-frequency and higher-current trend of electronic devices.

The decoupling capacitor for use in a high-speed micro processor unit (MPU) includes a two-terminal chip capacitor and a multi-terminal multi-layer chip capacitor. Also, a three-terminal feed-through multilayer chip capacitor for use in an electromagnetic-interference (EMI) filter may be employed as the decoupling capacitor. This two-terminal, three-terminal or multi-terminal multilayer chip capacitor is increasingly required to be reduced in size and ESL, thereby potentially causing external electrodes on opposing sides to be shorted to each other.

FIG. 1A is a perspective view illustrating a conventional two-terminal low-inductance ceramic capacitor. Referring to FIG. 1A, the capacitor 10 includes a capacitor body 11 and two external electrodes 13 and 14. The capacitor body 11 has a plurality of dielectric layers deposited therein. In the capacitor body 11, a plurality of internal electrodes (not shown) are deposited alternately with the dielectric layers and connected to the external electrodes 13 and 14. The external electrodes 13 and 14 are formed on opposing sides B1 and B2.

To attain lower ESL, the external electrodes 13 and 14 may be applied on the sides B1 and B2 of a relatively broad area. The external electrodes 13 and 14, when applied on the sides B1 and B2, are extended to a top A1 of the capacitor body due to characteristics of the process. With a smaller trend of the capacitor, the external electrodes 13 and 14 on the top A1 are disposed at a shorter distance d, thus more likely to be shorted to each other. Especially, due to limitations associated with the process of applying the external electrodes, each of the external electrodes 13 and 14 is extended by a length of 0.1 to 0.2 mm on the top A1. This renders it very hard to develop a smaller two-terminal multilayer chip capacitor with a 0306 size having a width W of 0.3 mm and a length L of 0.6 mm due to a risk of short between the external electrodes on the top A1. Moreover, from a standpoint of a user, not a developer, it may be very difficult to mount the multilayer chip capacitor having the external electrodes very closely spaced from each other on a printed circuit board (PCB) since even small errors in a mounting position may trigger serious defects. These are the problems also facing the multi-terminal and three-terminal feed-through capacitors.

FIG. 1B is a perspective view illustrating a conventional multi-terminal multilayer chip capacitor. Referring to FIG. 1B, the capacitor 20 includes a capacitor body 21 and a plurality of external electrodes 23 and 24. The four external electrodes 23 and the other four electrodes 24 are disposed on opposing sides B1 and B2, respectively. In the body 21, internal electrodes (not shown) are deposited to connect to the external electrodes 23 and 24 by leads.

Lower ESL and smaller scale required for the capacitor causes the external electrodes 23 and 24 on opposing sides B1 and B2 of the top A1 of the capacitor body to be disposed at a shorter distance d', and to be more likely to be shorted to each other. Notably, in a case where the multi-terminal capacitor 20 is reduced from a 1608 size to a 1005 size or to a 0603 size having a length L' of 0.6 mm and a width W' of 0.3 mmm, the external electrodes are more likely to be shorted to each other. When the external electrodes of different polarities are shorted to each other, the capacitor does not operate normally.

FIG. 1C is a perspective view illustrating a conventional three-terminal feed-through multilayer chip capacitor. Referring to FIG. 1C, the capacitor 30 includes a capacitor body 31 and external electrodes 33, 34, 35 and 36. The external electrodes 33 and 34 of one polarity are disposed on two opposing sides B1 and B2, respectively. Also, the external electrodes 35 and 36 of another polarity are disposed on other two opposing sides C1 and C2, respectively. This three-terminal capacitor may be employed as an EMI filter and a decoupling capacitor as well.

In a case where the three-terminal feed-through capacitor 30 is reduced from a 1005 size to a 0603 size having a length L" of 0.6 mm and a width W" of 0.3 mm, the external electrodes 33 and 34 on the top A1 are disposed at a shorter distance d", accordingly more likely to be shorted to each other. Such short between the external electrodes 33 and 34 may degrade capacitor characteristics.

SUMMARY OF THE INVENTION

An aspect of the present invention provides a highly reliable and smaller-sized multilayer chip capacitor in which external electrodes disposed on opposing sides of a capacitor body are effectively prevented from being shorted to each other.

According to an aspect of the present invention, there is provided a multilayer chip capacitor including: a capacitor body where a plurality of dielectric layers are deposited, the capacitor body having opposing first and second sides and opposing third and fourth sides; a plurality of layers of internal electrodes deposited alternately with the dielectric layers in the capacitor body; at least one first external electrode formed on the first side; and at least one second external electrode formed on the second side, wherein the first and second external electrodes are staggered with respect to each other and spaced apart from each other at a certain distance in a length direction of the first side.

One of the third and fourth sides may have a length shorter than a length of one of the first and second sides.

The multilayer chip capacitor may be a two-terminal multilayer chip capacitor. In this case, each of the internal electrodes may include a plurality of first and second internal electrodes, wherein the first and second internal electrodes are arranged alternately with each other, and each of the first internal electrodes is extended to the first side to have a lead connected to the first external electrode, and each of the second internal electrodes is extended to the second side to have a lead connected to the second external electrode.

The lead of the first internal electrode extended to the first side may be extended to the third side and the lead of the second internal electrode extended to the second side may be extended to the fourth side.

The multi-terminal multilayer chip capacitor may be a four-terminal multilayer chip capacitor. The first side may be provided with two first external electrodes having different polarities from each other and the second side may be provided with two second external electrodes having different polarities from each other, and each of the internal electrodes may have one lead extended to the first side and another lead extended to the second side.

The multi-terminal multilayer chip capacitor may be an eight-terminal multilayer chip capacitor. The first side may be provided with four first external electrodes, two of the first external electrodes having a first polarity and the other two first external electrodes having a second polarity, the second side may be provided with four second external electrodes, two of the second external electrodes having a first polarity and the other two second external electrodes having a second polarity, and each of the internal electrodes may have two leads extended to the first side and two leads extended to the second side.

The multi-terminal multilayer chip capacitor may include a different number of terminals such as six and ten, other than four or eight.

The multilayer chip capacitor may be a three-terminal feed-through multilayer chip capacitor. The multilayer chip capacitor may further include third and fourth external electrodes formed on the opposing third and fourth sides, respectively, wherein the first and second external electrodes have one polarity and the third and fourth external electrodes have another polarity.

Each of the internal electrodes may include a plurality of first and second internal electrodes, wherein the first and second internal electrodes are arranged alternately with each other, and each of the first-internal electrodes is extended to the first and second sides to have first and second leads connected to the first and second external electrodes, respectively and each of the second internal electrodes is extended to the third and fourth sides to connect to the third and fourth external electrodes, respectively.

BRIEF DESCRIPTION OF THE DRAWINGS

The above and other aspects, features and other advantages of the present invention will be more clearly understood from the following detailed description taken in conjunction with the accompanying drawings, in which:

FIG. 3 is a plan view illustrating an internal electrode structure of the multilayer chip capacitor of FIG. 2;

FIG. 4 is a perspective view illustrating an external appearance of a two-terminal multilayer chip capacitor according to a modified example of the capacitor of FIG. 2;

FIG. 7 is a plan view illustrating an internal electrode structure of the multilayer chip capacitor of FIG. 6;

FIG. 8 is a perspective view illustrating an external appearance of a multi-terminal multilayer chip capacitor according to an exemplary embodiment of the invention;

FIG. 9 is a plan view illustrating an internal electrode structure of the multilayer chip capacitor of FIG. 8;

FIG. 10 is a perspective view illustrating an external appearance of a three-terminal feed-through multilayer chip capacitor according to an exemplary embodiment of the invention;

FIG. 11 is a plan view illustrating an internal electrode structure of the multilayer chip capacitor of FIG. 10; and FIG. 12 is a schematic plan view illustrating a current path of three terminal feed-through multilayer chip capacitors according to Inventive Example and Comparative Example, respectively.

DETAILED DESCRIPTION OF THE PREFERRED EMBODIMENT

Figure 1A:
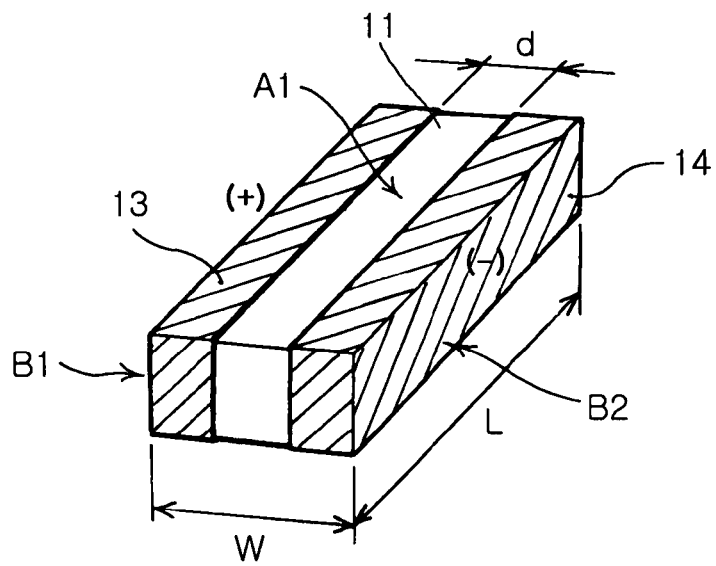
FIG. 1A is a perspective view illustrating an external appearance of a conventional two-terminal multilayer chip capacitor.
Figure 1B:
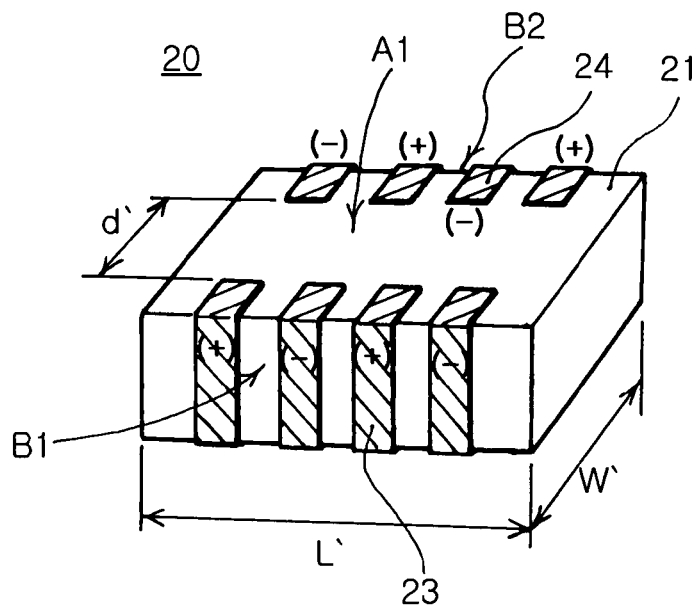
FIG. 1B is a perspective view illustrating an external appearance of a conventional multi-terminal multilayer chip capacitor.

Exemplary embodiments of the present invention will now be described in detail with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference signs are used to designate the same or similar components throughout.

Figure 2:
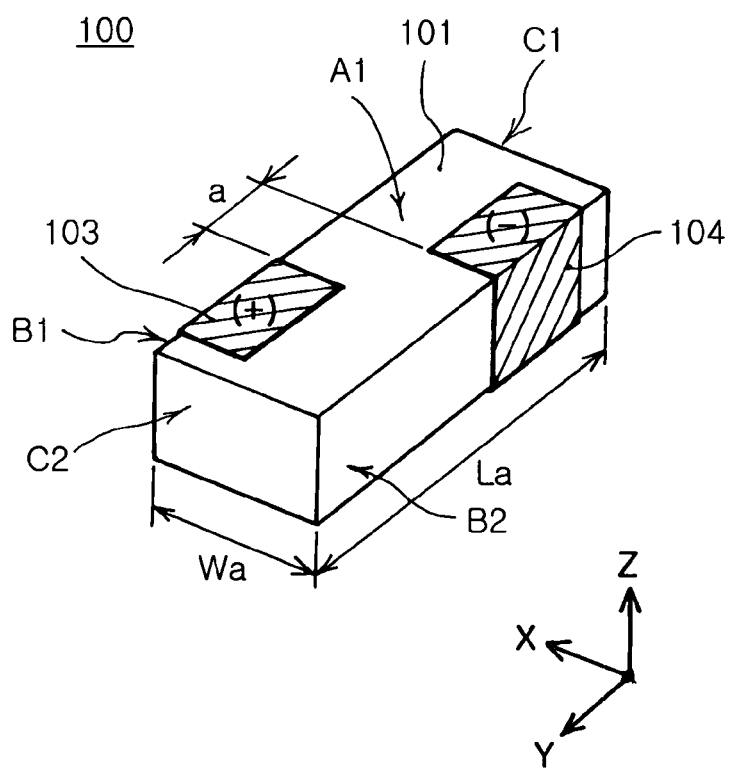
FIG. 2 is a perspective view illustrating an external appearance of a two-terminal chip capacitor according to an exemplary embodiment of the invention.

FIG. 2 is a perspective view illustrating a multilayer chip capacitor according to an exemplary embodiment of the invention. FIG. 3 illustrates an internal electrode structure of the capacitor of FIG. 2. A detailed description will be given hereinafter with reference to FIGS. 2 and 3. Particularly, the present embodiment illustrates a two-terminal low inductance ceramic capacitor. Referring to FIG. 2, the capacitor 100 includes a capacitor body 101 and two external electrodes 103 and 104. The capacitor body 101 has a plurality of dielectric layers deposited therein. A plurality of internal electrodes are disposed in the body 101 (see FIG. 3). The external electrodes 103 and 104 are disposed on opposing first and second sides B1 and B2 of the body 101 and extended to a top A1 of the body 101.

Referring to FIGS. 3A and 3B, the plurality of internal electrodes 123 and 124 are formed on dielectric layers 121 and 122, respectively. The internal electrodes 123 and 124 include a first internal electrode 123 and a second internal electrode 124. As shown in FIG. 3A, the first internal electrode 123 is connected to the first external electrode 103 of one polarity, e.g., plus polarity via a lead 123a extended to the first side B1. As shown in FIG. 3B, the second internal electrode 124 is connected to the second external electrode 104 of different polarity, e.g., minus polarity via a lead 124a extended to the second side B2. The adjacent first and second internal electrodes 123 and 124 constitute a capacitive element together with a corresponding one of the dielectric layers 121 or 122.

As shown in FIG. 2, in the capacitor body 101, one of a third side C1 and a fourth side or C2 has a length Wa smaller than a length La of one of the first side B1 and the second side B2. That is, a distance Wa between the first side B1 and the second side B2 is smaller than a distance La between the third side C1 and the fourth side C2. Therefore, the external electrodes 103 and 104 disposed on the first and second sides B1 and B2 reduce a current path and overall ESL of the capacitor. However, when the opposing sides B1 and B2 are extremely closely spaced from each other, the external electrodes on the top A1 may be more likely to be shorted to each other as described above. In the present embodiment, the external electrodes are modified in arrangement to effectively lower a risk of short.

As shown in FIG. 2, the first external electrode 103 formed on the first side B1 and the second external electrode 104 formed on the second side B2 are staggered with respect to each other. The first and second external electrodes 103 and 104 staggered with respect to each other are allowed to be spaced apart from each other at a certain distance a in a length direction of the first side B1 as indicated with Y. Accordingly, the external electrodes 103 and 104 on the opposing sides B1 and B2 are not in a face to face relation with each other and much less likely to be shorted to each other. In a case where the capacitor is required to be reduced from a 0510 size (Wa=0.5 mm, La=1.0 mm) to a 0360 size (Wa=0.3 mm, La=0.6 mm), the capacitor is reduced in a risk of defects caused by short, thereby allowing a two-terminal low inductance ceramic capacitor with a 0360 size to be manufactured and used easily.

FIG. 4 illustrates a two-terminal low inductance ceramic capacitor 100' according to a modified example of FIG. 3. FIG. 5 illustrates an internal electrode structure of the capacitor of FIG. 4. A detailed description will be given hereinafter with reference to FIGS. 4 and 5. In the embodiment of FIG. 4, a lead of the internal electrode is successively extended to two adjacent sides thereof to have a broad width. A great width of the lead further lowers ESL.

Referring to FIG. 4, first and second external electrodes 103' and 104' are formed on opposing first and second sides B1 and B2 of a capacitor body 101'. The first external electrode 103' is extended to a third side C1 and the second external electrode 104' is extended to a fourth side C2. This accordingly leads to a broader area of the external electrodes 103' and 104'. The external electrodes 103' and 104' of a broad area together with the lead of a broad width (refer to reference numerals 123a' and 124a' of FIG. 5) serve to reduce ESL.

Figures 5A, 5B:
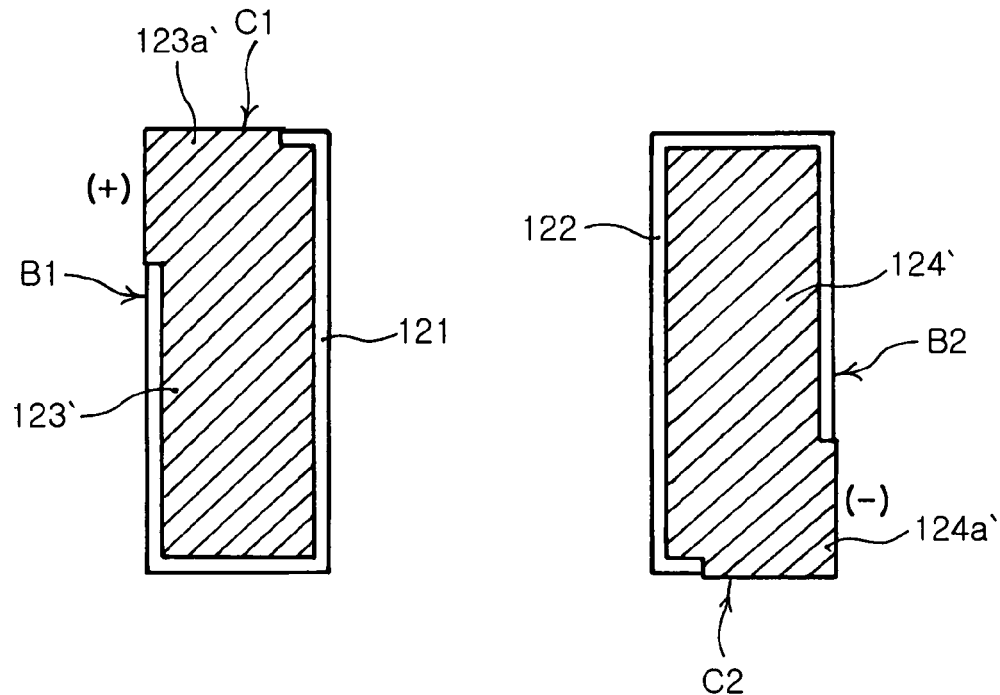
FIG. 5 is a plan view illustrating an internal electrode structure of the multilayer chip capacitor of FIG. 4.

Referring to FIG. 5A, a first internal electrode 123' is formed on a dielectric layer 121 to have a lead 123' extended to a first side B1 and a third side C1. The first internal electrode 123' is connected to the first external electrode 103' via a lead 123a' of a broad width. Referring to FIG. 5B, a second internal electrode 124' is formed on a dielectric layer 122 to have a lead 124a' extended to a second side B2 and a fourth side C2. The second internal electrode 124' is connected to the second external electrode 104' via the lead 124a' of a broad width.

In the present embodiment, the first and second external electrodes 103' and 104' are staggered with respect to each other and spaced apart from each other at a certain distance a' in a length direction of the first side B1 as indicated with Y. Therefore, the external electrodes 103' and 104' are less likely to be shorted to each other. Moreover, each of leads 123a' and 124a' is successively extended to the two adjacent sides, thereby further reducing ESL of the capacitor 100'.

Figure 6:
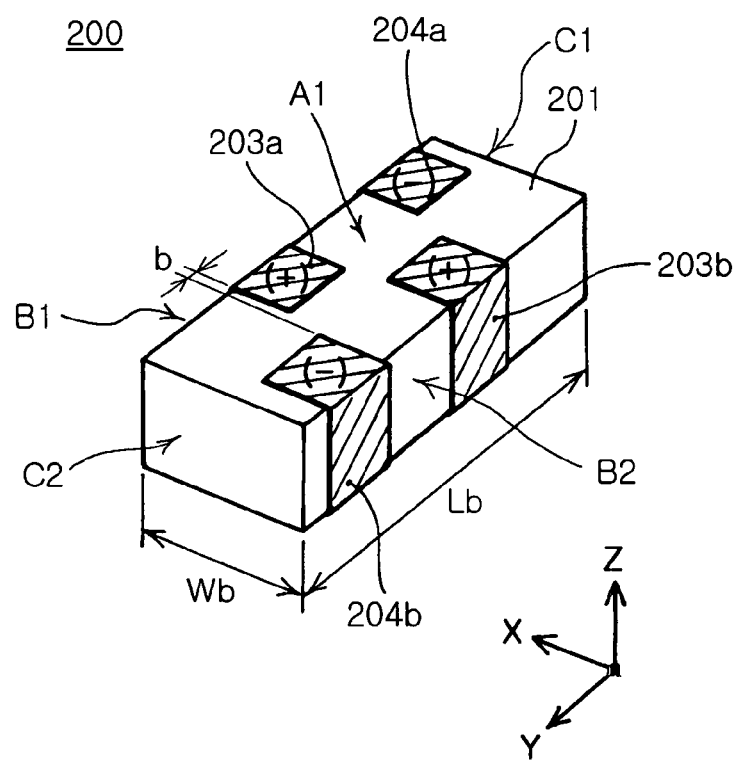
FIG. 6 is a perspective view illustrating an external appearance of a multi-terminal multilayer chip capacitor according to an exemplary embodiment of the invention.

FIG. 6 is a perspective view illustrating an external appearance of a multi-terminal multilayer chip capacitor according to an exemplary embodiment of the invention. FIG. 7 is a plan view illustrating an internal electrode structure of the capacitor of FIG. 7. A detailed description will be given hereinafter with reference to FIG. 6. The present embodiment is applied, but not limited, to a four-terminal capacitor and may be applied to a capacitor of a greater number of terminals such as six terminals, eight terminals and ten terminals.

Referring to FIG. 6, the capacitor 200 includes a capacitor body 201 and four external electrodes 203a, 203b, 204a, and 204b. Two first external electrodes 203a and 204a of different polarities from each other are disposed on a first side B1 and two second external electrodes 203b and 204b of different polarities from each other are disposed on a second side B2 opposing the first side B1.

Referring to FIG. 7A, a first internal electrode 223 is formed on a dielectric layer 221 and has a lead 223a extended to the first side and another lead 223b extended to the second side. Referring to FIG. 7B, a second internal electrode 224 is formed on a dielectric layer 222 and has a lead 224a extended to the first side and another lead 224b extended to the second side. The leads 223a and 223b of the first internal electrode 223 are connected to the external electrodes 203a and 203b of same polarity. Meanwhile, the leads 224a and 224b of the second internal electrode 224 are connected to the external electrodes 204a and 204b of different polarities. These first and second electrodes 223 and 224 are deposited alternately on each other in the capacitor body 201.

As shown in FIG. 7, the leads 223a and 223b of the first internal electrode 223 are disposed alternately with and adjacent to corresponding ones of the leads 224a and 224b of the second internal electrode 224, respectively. As described above, the leads of different polarities, for example, the lead 223a and the lead 224a, are arranged alternately with and adjacent to each other, thereby allowing magnetic flux induced by a high frequency current to be cancelled between the adjacent leads 223a and 224a, and accordingly reducing ESL.

As shown in FIG. 6, the first external electrodes 203a and 204a on the first side B1 and the second external electrodes 204b and 203b on the second side B2 are staggered with respect to each other, and spaced apart from each other at a certain distance b in a length direction of the first side as indicated with Y. Accordingly, the first and second external electrodes on the opposing sides are less likely to be shorted to each other. Notably, in a case where the multi-terminal multilayer chip capacitor is reduced from a 1608 size (Lb=1.6 mm, Wb=0.8 mm) to a 1005 size (Lb=1.0 mm, Wb=0.5 mm), or further to a 0603 size (Lb=0.6 mm, Wb=0.3 mm), the capacitor is reduced in a risk of defects due to short, thereby allowing a multi-terminal multilayer chip capacitor with a 0603 size to be manufactured and utilized more easily.

FIG. 8 is a perspective view illustrating an external appearance of an eight-terminal multilayer chip capacitor according to an exemplary embodiment of the invention. FIG. 9 is a plan view illustrating an internal electrode structure of the capacitor of FIG. 8. A detailed description will be given hereinafter with reference to FIGS. 8 and 9.

Referring to FIG. 8, the capacitor 300 includes a capacitor body 301 and eight external electrodes 303a, 303b, 303c, 303d, 304a, 304b, 304c, and 304d. A first side B1 is provided with four first external electrodes 303a, 303c, 304b, and 304d, in which the two first external electrodes 303a, and 303c have polarities different from those of the other two first external electrodes 304b, and 304d. A second side B2 is provided with four second external electrodes 303b, 303d, 304a, and 304c, in which the two second external electrodes 303b, and 303d have different polarities from those of the other two second external electrodes 304a, and 304c.

Referring to FIG. 9A, a first internal electrode 323 is formed on a dielectric layer 321 and has leads 323a and 323c extended to a first side B1 and other leads 323b and 323d extended to a second side B2. A second internal electrode 324 is formed on a dielectric layer 322 and has leads 324b and 324d extended to a first side B1 and leads 324a and 324c extended to a second side B2. The leads 323a, 323b, 323c, and 323d of the first internal electrode 323 are connected to the external electrodes 303a, 303b, 303c, and 303d of one polarity. Meanwhile, the leads 324a, 324b, 324c, and 324d of the second internal electrode 324 are connected to the external electrodes 304a, 304b, 304c, and 304d of another polarity. These first and second internal electrodes 323 and 324 are deposited alternately on each other in the capacitor body 301.

As shown in FIG. 9, the leads 323a, 323b, 323c, and 323d of the first internal electrode 323 are disposed alternately with and adjacent to corresponding ones of the leads 324a, 324b, 324c, and 324d of the second internal electrode 324, respectively. The leads of different polarities, for example, the leads 323a and 324b, arranged alternately with and adjacent to each other, allow magnetic flux induced by a high frequency current to be cancelled therebetween, thereby reducing ESL.

As shown in FIG. 8, the first external electrodes 303a, 304b, 303c, and 304d on the first side B1 and the second external electrodes 304a, 303b, 304c, and 303d on the second side B2 are staggered with respect to each other, and spaced apart from each other at a certain distance c in a length direction of the first side as indicated with Y. Therefore, according to the present embodiment, the external electrodes on the opposing sides are less likely to be shorted to each other. Notably, in a case where the eight-terminal multilayer chip capacitor is reduced from a 1608 size (Lc=1.6 mm, Wc=0.8 mm) to a 1005 size (Lc=1.0 mm, Wc=0.5 mm), or further to a 1005 size (Lc=0.6 mm, Wc=0.3 mm), the capacitor is reduced in a risk of defects caused by short, thereby allowing the eight-terminal multilayer chip capacitor with a 0603 size to be manufactured and utilized more easily.

FIG. 10 is a perspective view illustrating a three-terminal feed-through multilayer chip capacitor according to an exemplary embodiment of the invention. FIG. 11 is a plan view illustrating an internal electrode structure of the capacitor of FIG. 11. A detailed description will be given hereinafter with reference to FIGS. 10 and 11. Referring to FIG. 10, the capacitor 400 includes a capacitor body 401 and external electrodes 403a, 403b, 404a, and 404b. First and second external electrodes 403a and 403b of one polarity are disposed on opposing first and second sides B1 and B2 of the body 401, respectively. Also, third and fourth external electrodes 404a and 404b of another polarity are disposed on opposing third and fourth sides C1 and C2 of the body 401, respectively. The external electrodes, for example, the external electrodes 403a and 403b, formed on the opposing sides are of same polarity.

Referring to FIG. 11A, a first internal electrode 423 formed on a dielectric layer 421 is provided with a first lead 423a and a second lead 423b. The first lead 423a is extended to the first side B1 to connect to the first external electrode 403a and the second lead 423b is extended to the second side B2 to connect to the second external electrode 403b. Therefore, the first internal electrode 423 is electrically connected to the first and second external electrodes 403a and 403b of one polarity via the first and second leads 423a and 423b. Referring to FIG. 11B, a second internal electrode 424 formed on a dielectric layer 422 is extended to the fourth and fourth sides C1 and C2 to connect to the third and fourth external electrodes 404a and 404b of another polarity. These first and second internal electrodes 423 and 424 are deposited alternately on each other in the capacitor body 401.

As shown in FIG. 10, the first external electrode 403a on the first side B1 and the second external electrode 403b on the second side B2 are staggered with respect to each other and spaced apart from each other at a certain distance e in a length direction of the first side B1 as indicated with Y. Therefore, according to the present embodiment, the external electrodes on the opposing sides are less likely to be shorted to each other. Particularly, in a case where the three-terminal feed-through multilayer chip capacitor is reduced to a 0603 size, the capacitor is reduced in a risk of defects caused by short, thereby allowing the three terminal feed-through multilayer chip capacitor with a 0603 size to be manufactured and utilized more easily.

According to the present embodiment, the capacitor is decreased in short between the external electrodes, thereby reduced in ESL over a conventional one of the same size. This is because one of several current paths is noticeably shortened as described later.

Figure 1C:
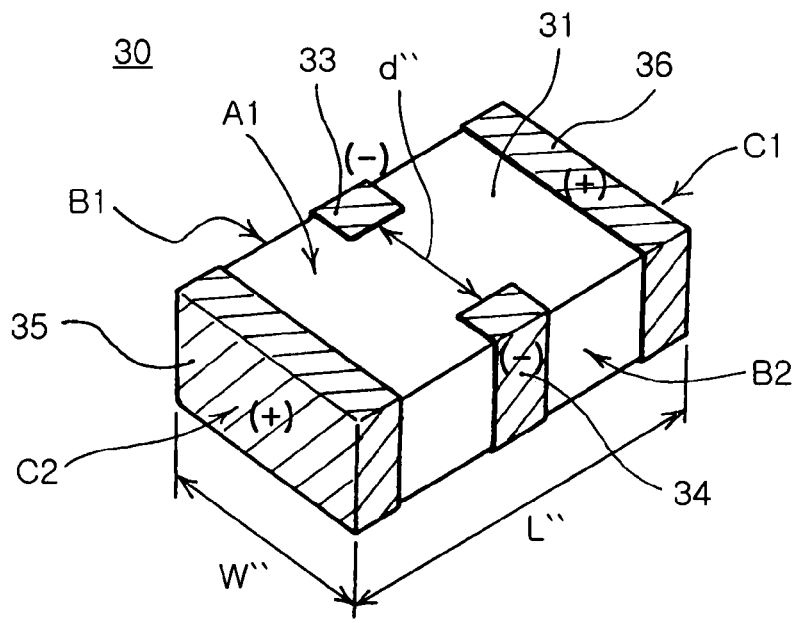
FIG. 1C is a perspective view illustrating an external appearance of a conventional three-terminal feed-through multilayer chip capacitor.

FIG. 12A is a schematic view illustrating current paths of a three terminal feed-through multilayer chip capacitor (see FIGS. 10 and 11) according to an exemplary embodiment of the invention. FIG. 12B is a schematic view illustrating current paths of a conventional three terminal feed-through multilayer chip capacitor (see FIG. 1C).

As shown in FIG. 12, in the capacitor 400 of the present embodiment, a current path $l_1$ between a first external electrode 403a and a third external electrode 404a is notably shorter than a current path $l_2$ between a second external electrode 403b and the third external electrode 404a. In contrast, in the conventional capacitor 30, two current paths $l_3$, and $l_4$ are similar in lengths. In a case where the two capacitors 400 and 30 are of the same size, the path $l_1$ of the capacitor 400 of the present embodiment is shorter than the path $l_3$ or $l_4$ of the conventional capacitor 30. When inductances resulting from two current paths are connected in parallel, an overall inductance is smaller than an inductance resulting from the shortest current path. Therefore, the capacitor 400 having the current paths $l_1$ and $l_2$ of different lengths exhibits lower ESL than the capacitor 30 having current paths $l_3$ and $l_4$ of similar lengths.

The inventors conducted ESL simulation tests on a two-terminal multilayer chip capacitor with a 0306 size (see FIG. 2) manufactured according to Inventive Example in order to identify ESL of the multilayer chip capacitor of the present embodiment. For comparison, a conventional two-terminal multilayer chip capacitor (see FIG. 1A) with a 0603 size manufactured according to Comparative Example underwent ESL simulation tests to measure ESL thereof. The results are shown in Table 1 below.

TABLE 1

| | Sample | |
|---|---|---|
| | Comparative Example | Inventive Example |
| Capacitor type | 0603 size, two-terminal, opposing external electrodes | 0306 size, two-terminal, staggered external electrodes |
| ESL | 217 pH | 180 pH |

As noted in Table 1, Inventive Example is decreased in ESL by about 17% over Comparative Example. As described above, Inventive Example attains sufficiently low ESL and is significantly decreased in a risk of short between the external electrodes even though the capacitor is reduced to a very small 0306 size or a much smaller size. The two-terminal capacitor with a 0306 size having external electrodes opposing each other, i.e., not staggered with respect to each other is expected to demonstrate smaller ESL than the ESL of the Inventive Example. However, such a two-terminal capacitor is hardly manufacturable due to a risk of short and considerably degraded in yield. In contrast, the capacitor of Inventive Example achieves sufficiently small ESL and is reduced in a risk of short between the external electrodes, thereby capable of being produced and utilized easily.

As set forth above, according to exemplary embodiments of the invention, a risk of short between external electrodes is effectively lowered. Accordingly, a capacitor is easily miniaturizable and a number of capacitors can be easily employed in a power circuit as a decoupling capacitor. In addition, the capacitor can be sufficiently decreased in ESL.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer chip capacitor comprising:
    a capacitor body where a plurality of dielectric layers are deposited, the capacitor body having opposing first and second sides and opposing third and fourth sides;
    a plurality of layers of internal electrodes deposited alternately with the dielectric layers in the capacitor body;
    at least one first external electrode formed on the first side; and
    at least one second external electrode formed on the second side,
    wherein the at least one first external electrode is not disposed at a portion of the first side onto which the at least one second external electrode is projected, but arranged at a certain distance from the projected portion.

2. The multilayer chip capacitor of claim 1, wherein the third side has a length shorter than a length of the first side.

3. The multilayer chip capacitor of claim 1, wherein the multilayer chip capacitor is a two-terminal multilayer chip capacitor.

4. The multilayer chip capacitor of claim 3, wherein each of the internal electrodes comprises a plurality of first and second internal electrodes,
    wherein the first and second internal electrodes are arranged alternately with each other, and
    each of the first internal electrodes is extended to the first side to have a lead connected to the first external electrode, and each of the second internal electrodes is extended to the second side to have a lead connected to the second external electrode.

5. The multilayer chip capacitor of claim 4, wherein the lead of the first internal electrode extended to the first side is extended to the third side and the lead of the second internal electrode extended to the second side is extended to the fourth side.

6. The multilayer chip capacitor of claim 5, wherein the first external electrode is extended to the third side and the second electrode is extended to the fourth side.

7. The multilayer chip capacitor of claim 1, wherein the multilayer chip capacitor is a multi-terminal multilayer chip capacitor comprising at least four terminals.

8. The multilayer chip capacitor of claim 7, wherein each of the internal electrodes comprises a plurality of first and second internal electrodes,
    wherein the first and second internal electrodes are arranged alternately with each other, and
    each of the first internal electrodes has at least one lead connected to an external electrode of one polarity and each of the second internal electrodes has at least one lead connected to an external electrode of another polarity.

9. The multilayer chip capacitor of claim 8, wherein the lead of the first internal electrode is arranged alternately with and adjacent to the lead of the second internal electrode.

10. The multilayer chip capacitor of claim 7, wherein the multi-terminal multilayer chip capacitor is a four-terminal multilayer chip capacitor.

11. The multilayer chip capacitor of claim 10, wherein the first side is provided with two first external electrodes having different polarities from each other and the second side is provided with two second external electrodes having different polarities from each other, and
    each of the internal electrodes has one lead extended to the first side and another lead extended to the second side.

12. The multilayer chip capacitor of claim 7, wherein the multi-terminal multilayer chip capacitor is an eight-terminal multilayer chip capacitor.

13. The multilayer chip capacitor of claim 12, wherein the first side is provided with four first external electrodes, two of the first external electrodes having a first polarity and the other two first external electrodes having a second polarity,
    the second side is provided with four second external electrodes, two of the second external electrodes having a first polarity and the other two second external electrodes having a second polarity, and
    each of the internal electrodes has two leads extended to the first side and two leads extended to the second side.

14. The multilayer chip capacitor of claim 1, wherein the multilayer chip capacitor is a three-terminal feed-through multilayer chip capacitor.

15. The multilayer chip capacitor of claim 14, further comprising third and fourth external electrodes formed on the opposing third and fourth sides, respectively,
    wherein the first and second external electrodes have one polarity and the third and fourth external electrodes have another polarity.

16. The multilayer chip capacitor of claim 15, wherein each of the internal electrodes comprises a plurality of first and second internal electrodes,
    wherein the first and second internal electrodes are arranged alternately with each other, and
    each of the first internal electrodes is extended to the first and second sides to have first and second leads connected to the first and second external electrodes, respectively and each of the second internal electrodes is extended to the third and fourth sides to connect to the third and fourth external electrodes, respectively.

17. The multilayer chip capacitor of claim 1, wherein the at least one first external electrode and the at least one second external electrode extend along the first side and the second side in the lateral direction of the first side and the second side respectively, and terminate at the third side adjoining the first and second sides, and the at least one first external electrode and the at least one second external electrode are staggered on the third side with each other in the longitudinal direction of the third side, and spaced apart from each other at a certain distance in the longitudinal direction of the third side.

* * * * *